(12) United States Patent
Na et al.

(10) Patent No.: US 9,532,199 B2
(45) Date of Patent: Dec. 27, 2016

(54) MOBILE TERMINAL AND METHOD FOR CONTROLLING SAME

(71) Applicant: LG ELECTRONICS INC., Seoul (KR)

(72) Inventors: Sungchae Na, Seoul (KR); Changju Na, Seoul (KR); Jeongeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/652,725

(22) PCT Filed: Jul. 14, 2014

(86) PCT No.: PCT/KR2014/006319
§ 371 (c)(1),
(2) Date: Jun. 16, 2015

(87) PCT Pub. No.: WO2015/012519
PCT Pub. Date: Jan. 29, 2015

(65) Prior Publication Data
US 2015/0319589 A1  Nov. 5, 2015

(30) Foreign Application Priority Data
Jul. 26, 2013 (KR) .......................... 10-2013-0089155

(51) Int. Cl.
*H04W 4/16* (2009.01)
*H04W 4/12* (2009.01)
*H04W 12/06* (2009.01)
*H04M 3/42* (2006.01)

(52) U.S. Cl.
CPC ................. *H04W 4/16* (2013.01); *H04M 3/42* (2013.01); *H04W 4/12* (2013.01); *H04W 12/06* (2013.01)

(58) Field of Classification Search
CPC ........ H04W 4/16; H04W 88/18; H04W 12/06; H04M 3/50; H04M 3/487; H04M 1/64; H04M 1/271; H04M 1/7253; H04M 15/31; H04M 1/274575; H04M 2250/12; H04M 1/6041; H04M 2250/22; G10L 17/00; G10L 17/08; G10L 17/22; G06F 9/542; H04N 5/232; H04N 5/2352; H04N 21/4126; H04N 21/41407; H04N 21/42203; H04N 21/4788; H04N 7/141; H04N 7/148; H02J 13/0086; H02J 13/0062; H04L 2012/2841; H04L 12/14; H04L 63/083; H04L 63/0861; H04L 63/105; G08B 13/19684
See application file for complete search history.

(56) References Cited

U.S. PATENT DOCUMENTS 6,421,439 B1 * 7/2002 Liffick .................... G06F 9/542
379/201.02
7,613,287 B1 * 11/2009 Stifelman ......... H04M 3/42017
379/201.01
(Continued)

FOREIGN PATENT DOCUMENTS

EP          2129089       12/2009
KR       10-0477061       3/2005
(Continued)

OTHER PUBLICATIONS

PCT International Application No. PCT/KR2014/006319, Written Opinion of the International Searching Authority dated Oct. 27, 2014, 7 pages.
(Continued)

*Primary Examiner* — Nizar Sivji
(74) *Attorney, Agent, or Firm* — Lee, Hong, Degerman, Kang & Waimey

(57) ABSTRACT

The present invention relates to a mobile terminal and, more specifically, to a mobile terminal and a method for control-
(Continued)

ling the same which are capable of automatically responding to a caller when a user cannot respond to a call or when a given condition is satisfied. The method for controlling a mobile terminal related to an embodiment of the present invention may comprise the steps of: activating an automatic response function when a preset activation condition is satisfied; accepting a voice call when a call signal is received form a caller; performing an authentication procedure determining an automatic response type: and performing a function requested by the caller through at least one, corresponding to the determined response type, among voice, text and a graphic user interface, within a range corresponding to the result of the authentication procedure, while the accepted voice call is connected.

16 Claims, 13 Drawing Sheets

(56) References Cited

U.S. PATENT DOCUMENTS

2005/0273333 A1* 12/2005 Morin ............... G10L 17/22
704/247
2006/0167995 A1* 7/2006 Rui ................... H04N 7/147
709/204
2008/0298564 A1* 12/2008 Rondeau ........... H04M 3/53366
379/88.26
2010/0056100 A1* 3/2010 Elman ................ H04M 3/4938
455/404.1
2010/0325202 A1* 12/2010 Rehtijarvi ............... H04L 67/34
709/203
2012/0284026 A1* 11/2012 Cardillo .................. G10L 17/08
704/246

FOREIGN PATENT DOCUMENTS

KR  10-2005-0116684  12/2005
KR  10-2006-0000828  1/2006
KR  10-2011-0063037  6/2011

OTHER PUBLICATIONS

European Patent Office Application No. 14828670.1, Search Report dated Oct. 19, 2016, 6 pages.

* cited by examiner

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2014/006319, filed on Jul. 14, 2014, which claims the benefit of earlier filing date and right of priority to Korean Application No. 10-2013-0089155, filed on Jul. 26, 2013, the contents of which are all hereby incorporated by reference herein in their entirety.

TECHNICAL FIELD

The present invention relates to a mobile terminal, and more particularly, to a mobile terminal and controlling method thereof. Although the present invention is suitable for a wide scope of applications, it is particularly suitable for automatically make a response to a call from a caller if a user is unable to respond to the call or a prescribed condition is met.

BACKGROUND ART

Terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, a mobile terminal of a smart type tends to be loaded with a voice recognition function capable of recognizing a user's voice and running a function mapped to the recognized voice. However, such a function is just able to perform a user's command in dedicated mode for voice recognition.

DISCLOSURE OF THE INVENTION

Technical Task

Accordingly, the present invention is directed to a mobile terminal and controlling method thereof, by which a response to a caller can be made in accordance with an incoming call signal.

Particularly, the technical task of the present invention is to provide a mobile terminal and controlling method thereof, by which a response in a different range can be provided in a manner of distinguishing a user from a stranger.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

In one technical aspect of the present invention, provided herein is a mobile terminal, including a wireless communication unit and a controller, if a preset activation condition is met, activating an automatic response function, the controller, if there is an incoming call signal from a caller, accepting a voice call, the controller performing an authentication procedure, the controller determining an automatic response type, the controller, while the accepted voice call is connected, controlling a function requested by the caller to be performed in a range corresponding to a result of the authentication procedure through at least one of a voice, a text and a graphic user interface to correspond to the determined automatic response type.

In another technical aspect of the present invention, provided herein is a method of controlling a mobile terminal, including the steps of if a preset activation condition is met, activating an automatic response function, if there is an incoming call signal from a caller, accepting a voice call, performing an authentication procedure, determining an automatic response type, and while the accepted voice call is connected, performing a function requested by the caller in a range corresponding to a result of the authentication procedure through at least one of a voice, a text and a graphic user interface to correspond to the determined automatic response type.

Advantageous Effects

According to the present invention, if a prescribed condition is met, a response through a voice or a user interface can be made to a caller in accordance with an incoming call signal.

In particular, a response in a different range can be provided through a prescribed authentication procedure in a manner of distinguishing a user from an acquaintance or a stranger.

Effects obtainable from the present invention may be non-limited by the above mentioned effect. And, other unmentioned effects can be clearly understood from the following description by those having ordinary skill in the technical field to which the present invention pertains.

BEST MODE FOR INVENTION

In the following detailed description, reference is made to the accompanying drawing figures which form a part hereof, and which show by way of illustration specific embodiments of the invention. As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
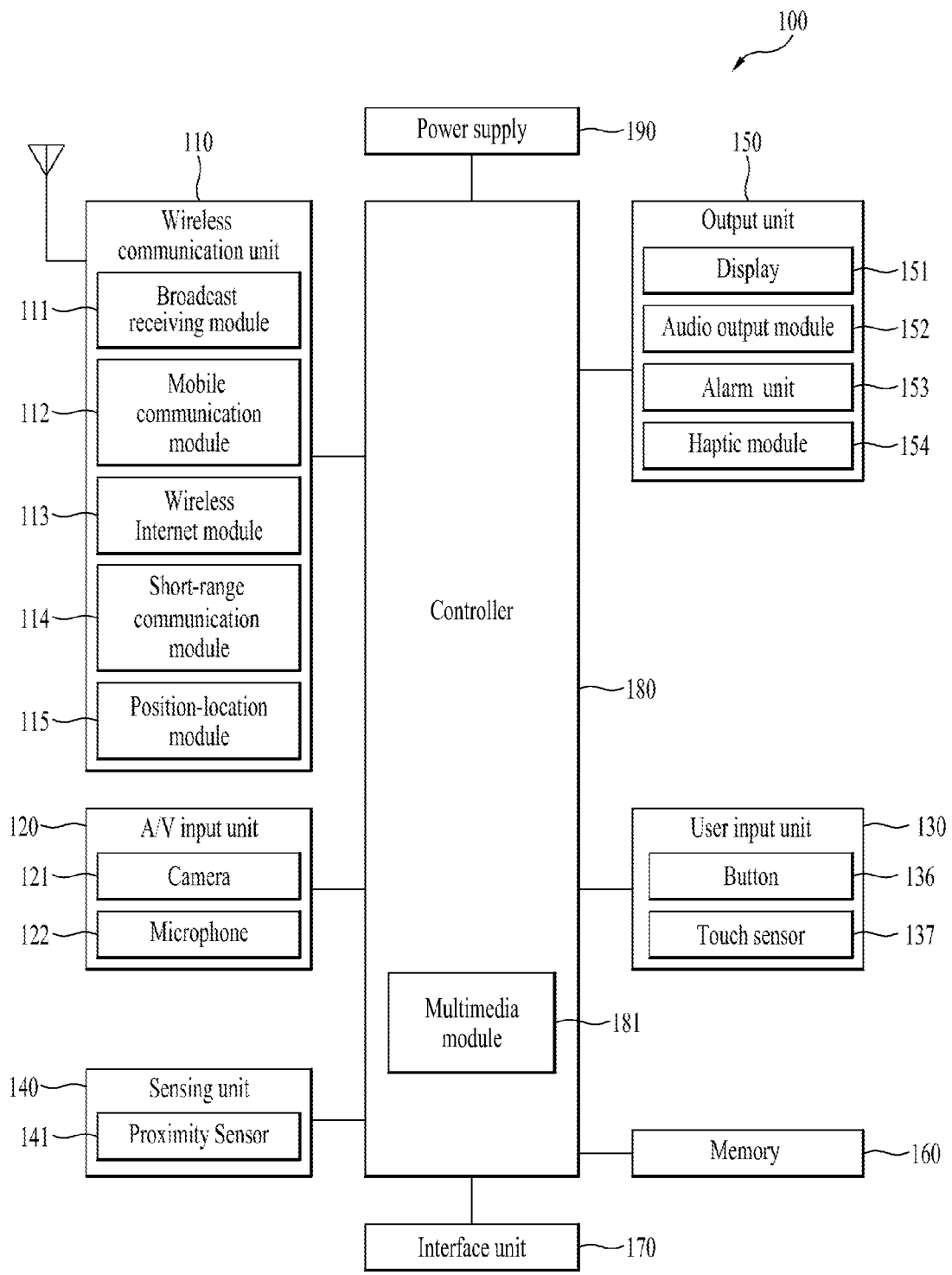
FIG. 1 is a block diagram of a mobile terminal related to one embodiment of the present invention.

FIG. 1 is a block diagram of a mobile terminal 100 in accordance with an embodiment of the present invention.

With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. More or fewer components may be implemented according to various embodiments.

The components of the mobile terminal will be explained hereafter in detail.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™ to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch. FIG. 1 also illustrates the user input unit 130 can include a button 136 (hard or soft button) and a touch sensor 137.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100. As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power. The power supply unit 190 may include a battery, a connecting port, a power supply controller, and recharge monitoring module.

The battery may be rechargeable, and be configured to be embedded in the terminal body, or configured to be detachable from the terminal body. The connecting port may be a part of the interface unit 170 for providing power to the battery.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
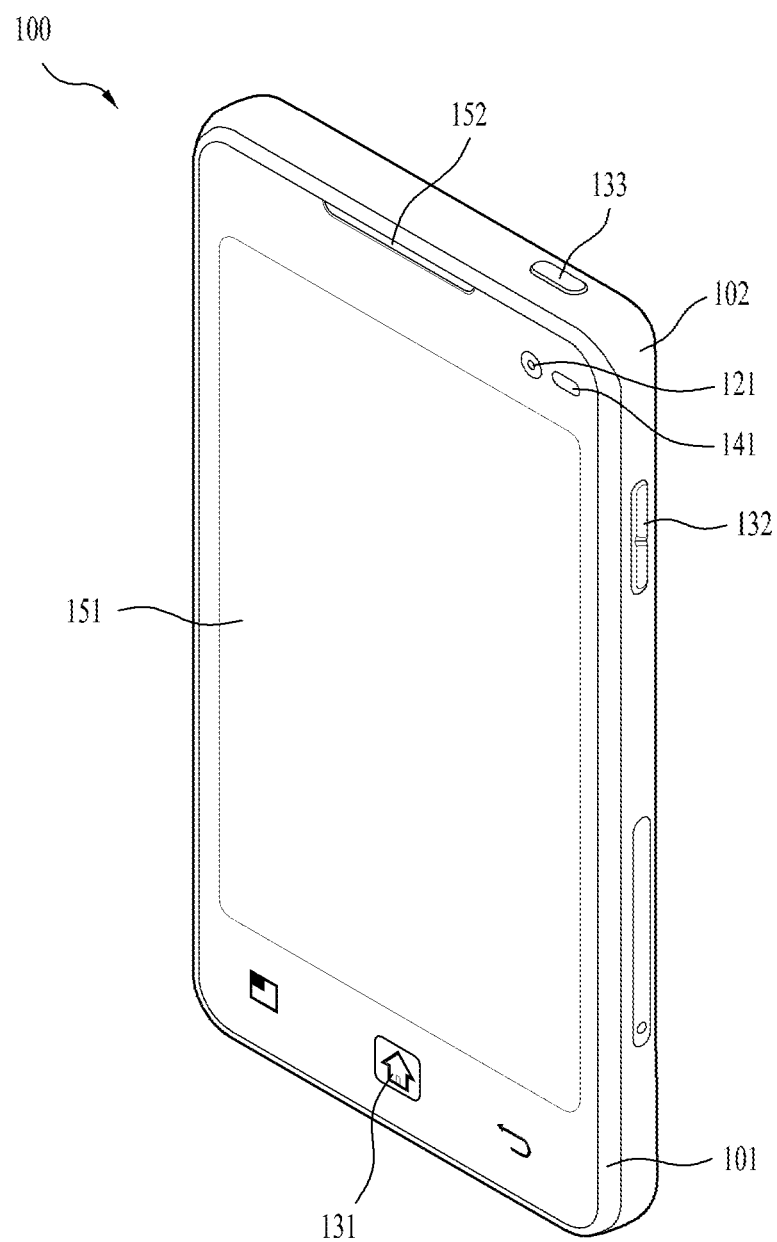
FIG. 2 is a front perspective diagram of a mobile terminal related to one embodiment of the present invention.

FIG. 2 is a front perspective view of a mobile terminal according to one embodiment of the present invention.

The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, the present invention applies equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102.

The case may also include an open hole for inserting detachable parts such as a sub-storage medium (e.g., USIM card or a memory card). The open hole may be provided at the side face or the surface of rear face of the case.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130.

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102. Another manipulating unit 133 can be provided on a top portion of the case 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132. Also, third manipulating unit 133 may receive a command for activating or deactivating touch input recognition at the touchscreen 151.

The manipulating units 131, 132 and 133 may be a pressure-sensitive buttons or touch-sensitive buttons.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

Automatic Response Function

If a user goes out by leaving a mobile terminal at home, the user worries about who contacts the user or how to handle a business. A person making a phone call to a corresponding mobile terminal may intends to contact the user or handle a simple business. Of course, although a user possesses a mobile terminal, the user may not be able to recognize an incoming call signal or accept a corresponding call depending on user's situation. To prepare for such a case, according to one embodiment of the present invention, provided are a mobile terminal and controlling method thereof. In particular, if a prescribed condition is met (e.g., a case that a user is determined as unable to make a response to a call, a case that an automatic response command is inputted, etc.), the mobile terminal can make a response to a caller automatically. An automatic response function according to the present invention can be implemented with an application installed on a mobile terminal or an application loaded on an operating system (OS). For clarity of the following description, a corresponding application itself, an automatic response function run by the corresponding application, or an automatic response mode run by the corresponding application shall be named a voice secretary, a voice agent, an agent, or the like.

An operation environment and process of an agent according to the present invention are described in detail with reference to FIG. 3 as follows.

Figure 3:
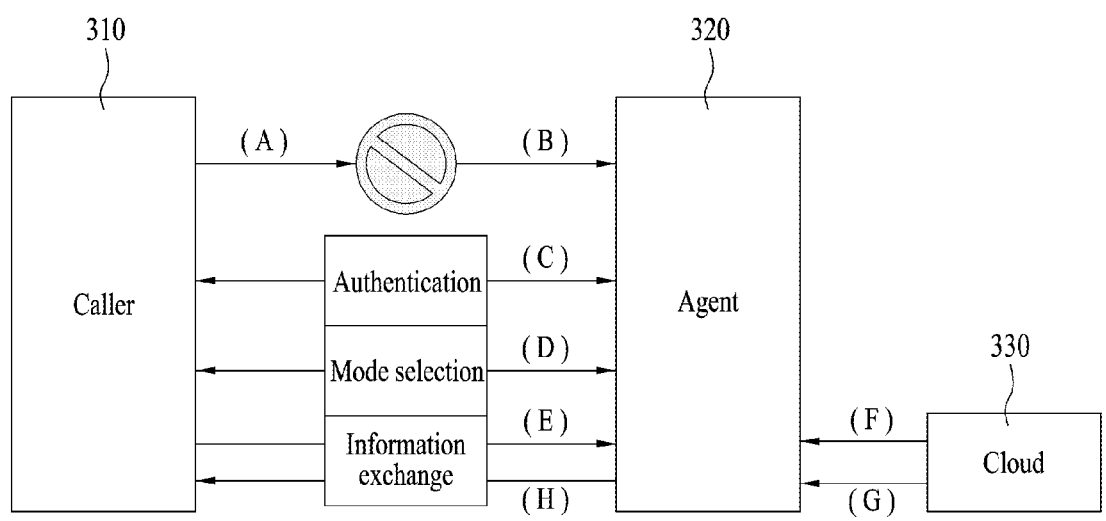
FIG. 3 is a conceptional diagram for one example of an operating environment and process of a voice agent providable in a mobile terminal according to one embodiment of the present invention.

FIG. 3 is a conceptional diagram for one example of an operating environment and process of a voice agent providable in a mobile terminal according to one embodiment of the present invention.

In FIG. 3, each entity is assorted based on functionality rather than device configuration. Referring to FIG. 3, an operating environment of an agent may include a caller 310, an agent 320, and a cloud 330. The caller 310 may include a smartphone having a configuration similar to that of the mobile terminal 100, a general mobile phone, or a wire phone. The agent 320 can be implemented with an application run by an operation through the controller 180 in the mobile terminal 100 of a user. The cloud 330 may include an external entity capable of providing a cloud service or a service similar to the cloud service. Yet, since the cloud 330 is not a necessary component, it may be omitted if necessary.

First of all, as an absence situation A occurs, the controller 180 can activate the agent 320 [B]. in this case, the absence situation A may include one of a case of failure in a call connection in accordance with an incoming call signal from the caller 310 (i.e., missed calls occur once or as many as a preset count), a case that a call connection attempt time is equal to or greater than a prescribed time, a case that a state of a mobile terminal meets a preset condition in the course of a call connection attempt, and the like. The state of the mobile terminal meeting the preset condition may include one of a case that the controller 180 detects that the mobile terminal is moving (e.g., a detection of a current location change through the position location module, a detection of sway through the gravity sensor, etc.), a case that the mobile terminal is not in use for a predetermined time before an incoming call signal, and the like. Of course, irrespective of the incoming call signal, the agent may be activated in accordance with the absence situation. For example, the absence situation may include one of a case of a timing point corresponding to a specific schedule previously set by a user through an alarm/schedule application, a case that a user inputs an agent activation command by manipulating the mobile terminal in direct, and the like.

The agent automatically makes a response to a call signal received after the activation of the agent. In particular, if there is an incoming call signal from the caller 310, the controller 180 determines a call connection to the corresponding call signal and is able to perform an authentication C on the caller 310 to determine a response level. Moreover, a mode selection D for determining a response way can be performed. An authentication method, a response level and a mode type shall be described in detail later.

Once the authentication and the mode selection are completed, the agent 320 can provide a response H to a matter E requested by the caller 310 in accordance with the determined response level and the selected mode. While the process of the aforementioned authentication C or the aforementioned response H is performed, if information is not enough to perform the corresponding process, the agent 320 can request/inquire (F) and obtain (G) the necessary information through the cloud 330. Of course, the agent 320 is able to update the memory 160 with the information obtained through the cloud 330.

Although FIG. 3 shows that the mode selection D is performed after the authentication C, the authentication C may be performed ahead of the mode selection D.

In the following description, an authentication procedure is described with reference to FIG. 4.

Figure 4:
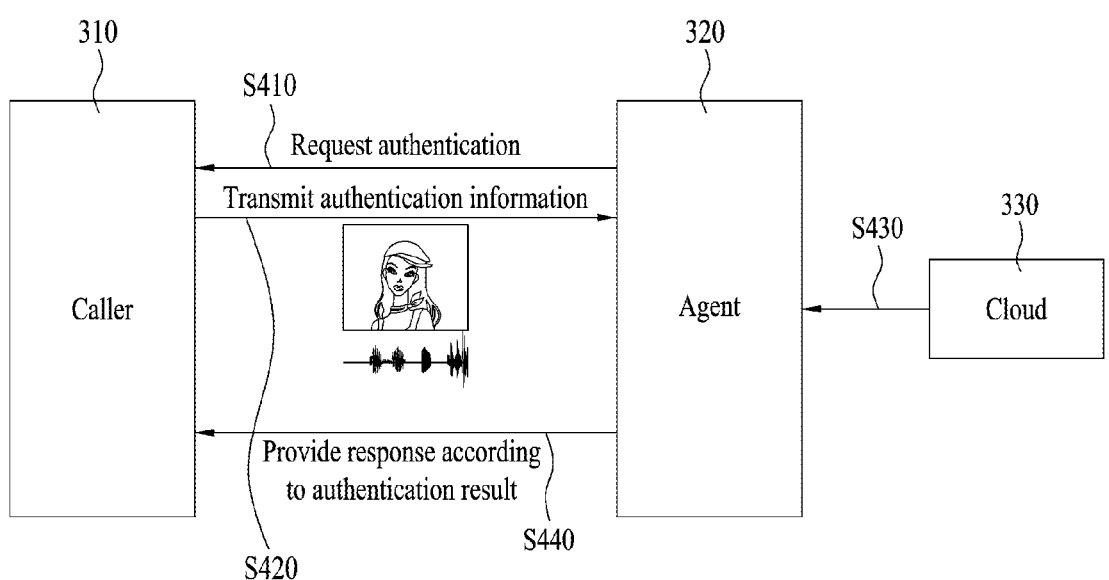
FIG. 4 is a diagram for one example of a process for performing an authentication procedure through a voice agent in a mobile terminal according to one embodiment of the present invention.

FIG. 4 is a diagram for one example of a process for performing an authentication procedure through a voice agent in a mobile terminal according to one embodiment of the present invention. Assume that FIG. 4 shows a process following a call connection for an incoming call signal after activation of an agent 320.

Referring to FIG. 4, first of all, an agent 320 can make a request for authentication [S410]. If a mode selection is not performed in advance, the authentication request can be made using a voice by TTS or the like. For example of a requested matter, the agent 320 may make a request to input a random caller voice or a request to send a photo of the caller, or may make a request for an answer to a query to the caller. If the caller 310 sends an authentication information in response to the request [S420], the agent 320 determines a response level, which is determined through the authentication information, corresponding to the caller and is able to provide the determined response level to the caller [S440]. Of course, if the information required for the determination of the response level in this authentication procedure is not enough, the agent 320 may make a request for information required for the authentication to the cloud 330 [S430] or may delegate the response level determination to the cloud 330.

In some cases, the step S410 and the step S420 may be performed plural times. For instance, the agent asks the caller who the caller is. If the caller verifies identity of its own through a voice, the agent may make a request for the authentication information appropriate for the corresponding identity again. In particular, if the caller 310 responds that the caller 310 is a user (or, an owner) of the mobile terminal, the agent can create a query using an information previously set by a user, a use history (e.g., when a last call was made yesterday, where the user was in the yesterday afternoon using a location information record, etc.) of the mobile terminal, or a user's profile (e.g., family birthdays, etc.) saved in the mobile terminal. Moreover, in case that the caller 310 responds that the caller 310 is an acquaintance of the user, the agent may determine whether the caller is the acquaintance by searching an address book, an SNS friend list and the like or creating a query (e.g., a last call with a user?) through a use history mapped to a corresponding contact.

Meanwhile, if the agent 320 makes a request for a photo of the caller in the step S410, a camera application running signal can be sent to the terminal of the caller together with the photo. Of course, an authentication procedure can be substituted with Caller ID (CID) check.

A mode selecting process is described in detail as follows. Modes provided by a voice agent according to the present invention can be mainly classified into three types in accordance with response ways. In particular, the providable modes can be classified into: 1) a voice mode of responding with a voice only irrespective of a function provided by a terminal of a caller; 2) a text mode of providing a voice of an agent and a voice of a caller recognized by the agent together with texts based on voices; and 3) a UI mode of providing a terminal of a caller with a response function directly selectable by the caller through a graphic user interface. In this case, in order to provide a text mode and a UI mode, it is preferable that a separate application is installed on a terminal of a caller in advance. In particular, in case that a UI mode is provided through a touchscreen, the UI mode may be called a touch mode.

In the following description, a mode selecting process and a type of providing each mode are described in detail with reference to FIG. 5. According to the example shown in FIG. 5, assume that an application capable of providing a text mode and a UI mode is installed on a terminal of a caller in advice. And, assume that a touchscreen is provided to the terminal of the caller.

Figure 5:
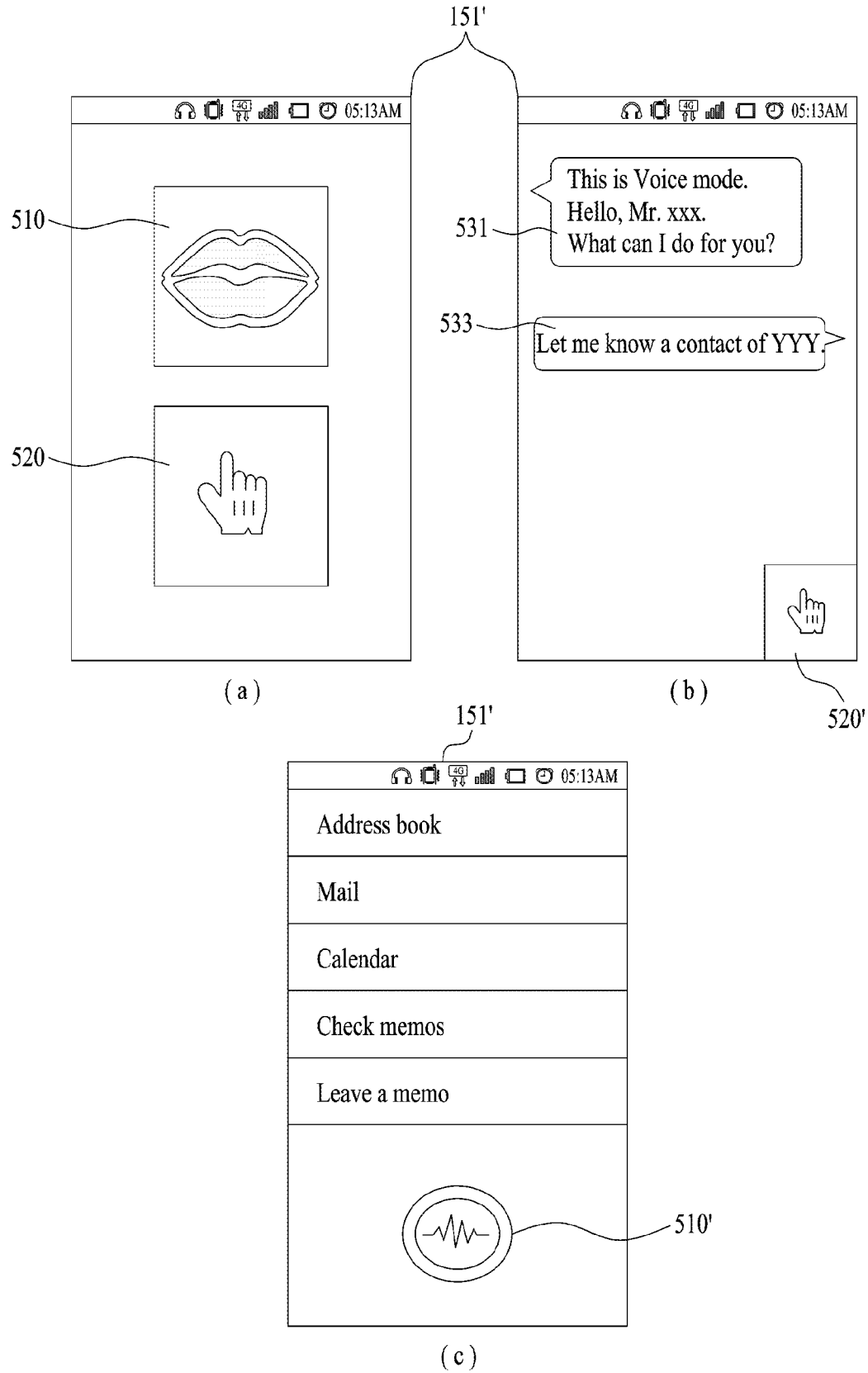
FIG. 5 is a diagram for one example of a mode selecting process for determining a response way of a voice agent in a caller terminal and a mode running screen by the mode selecting process according to one embodiment of the present invention.

FIG. 5 is a diagram for one example of a mode selecting process for determining a response way of a voice agent in a caller terminal and a mode running screen by the mode selecting process according to one embodiment of the present invention.

As a voice agent response is initiated or an authentication procedure is completed, the agent can send a signal for running an application for providing a mode to a terminal of a caller through the wireless communication unit 110. Hence, referring to FIG. 5 (a), a mode select menu can be displayed on a touchscreen 151' of the terminal of the caller. The mode select menu can include an icon 510 mapped to a text mode and an icon 520 mapped to a touch mode. In this case, if the caller selects the icon 510 mapped to the text mode, referring to FIG. 5 (b), as the text mode is run, a response message 531 provided by the agent and a message 533 mapped to a voice of the caller can be displayed as texts, respectively. In the text mode, an icon 520' for switching to the touch mode can be displayed in addition.

On the other hand, if the caller selects the icon 520 mapped to the touch mode in the situation shown in FIG. 5 (a), referring to FIG. 5 (c), menus selectable through a touch can be displayed. If the caller is confirmed as a user of the mobile terminal through an authentication procedure, a menu (e.g., 'memo check') for checking a response history provided to another caller through the agent can be additionally displayed on the menu. Of course, an icon 510' for switching the touch mode to the text mode can be displayed.

In doing so, the terminal of the caller can transmit a signal mapped to the selected mode to the mobile terminal.

Figure 6:
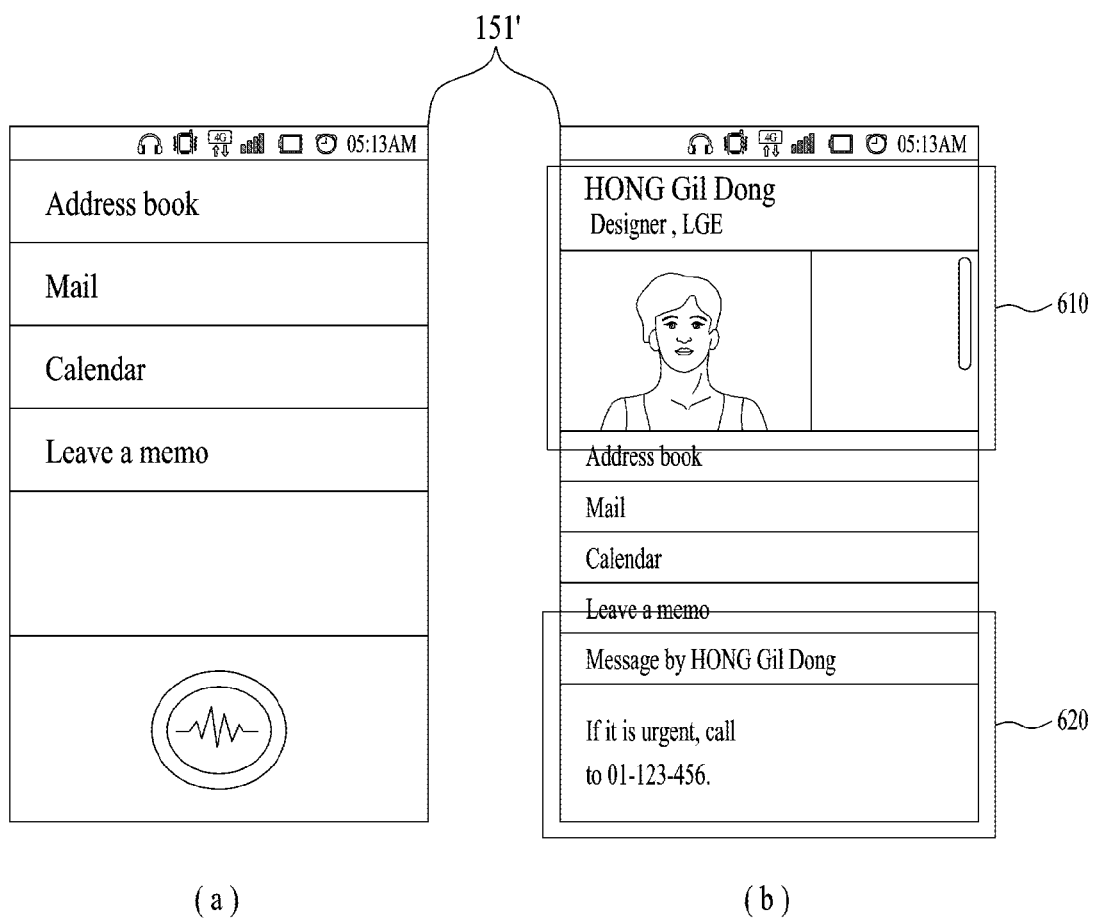
FIG. 6 is a diagram for one example of a type of providing a touch mode in a caller terminal according to one embodiment of the present invention.

As a result of the authentication, if the caller is determined not as the user but the acquaintance or a 3$^{rd}$ character, referring to FIG. 6 (a), the menu (e.g., 'memo check') for checking the response history provided to another caller through the agent may not be displayed on an initial screen of the touch mode. Moreover, referring to FIG. 6 (b), an information of a user's profile 610 set by the user of the mobile terminal 100 or a message 620 composed for the caller by the user may be displayed in addition.

Meanwhile, a response range according to the authentication result may be classified into a user range of providing all possible functions, an acquaintance range of providing functions restricted more than those of the user range, or a stranger range of providing functions further restricted than those of the acquaintance range. In this case, the acquaintance range may be further classified into multiple steps by subdividing the restricted functions necessarily.

One example of a function providable to an acquaintance is described in detail with reference to FIG. 7 as follows.

Figure 7:
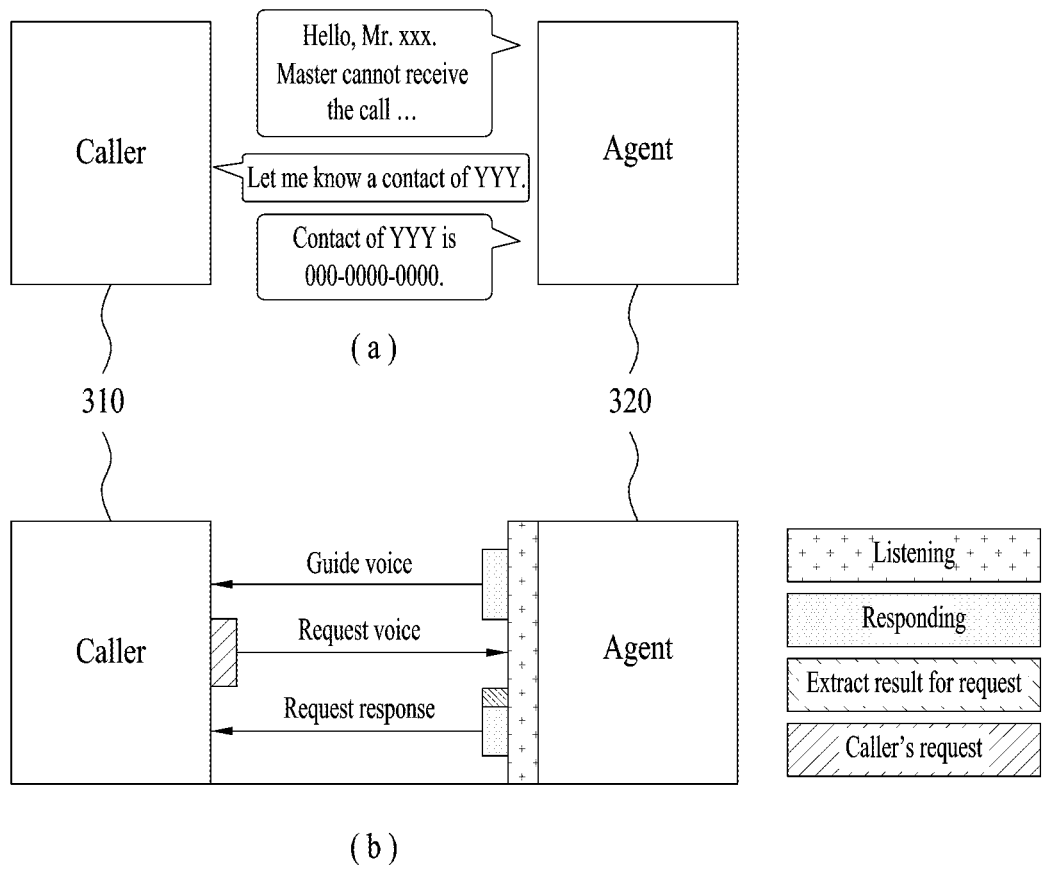
FIG. 7 is a diagram for one example of a type of providing a response to an acquaintance through a voice agent in a mobile terminal according to one embodiment of the present invention.

FIG. 7 is a diagram for one example of a type of providing a response to an acquaintance through a voice agent in a mobile terminal according to one embodiment of the present invention. In FIG. 7, assume a case that an acquaintance is allowed to search contacts. And, assume a case that a message is exchanged between a caller and an agent through a voice mode or a text mode.

Referring to FIG. 7 (a), as an agent 320 reveals a determination result and a service providing intention to a caller 310 determined as an acquaintance through a guide voice, the caller 310 makes a request for a contact information of a specific person through a request voice. Hence, the agent 320 is able to provide a request response to the requested information by searching the memory 160 or the cloud 330. In doing so, while the guide voice providing is not completed, in order to prepare for a case that the caller delivers a request voice by interrupting the guide voice, referring to FIG. 7 (c), it is preferable that the agent 320 is in a state capable of recognizing a voice of the caller in the whole interval having an agent function activated therein.

A function performed in case of a determination not as an acquaintance but as a stranger is described in detail with reference to FIG. 8 as follows.

Figure 8:
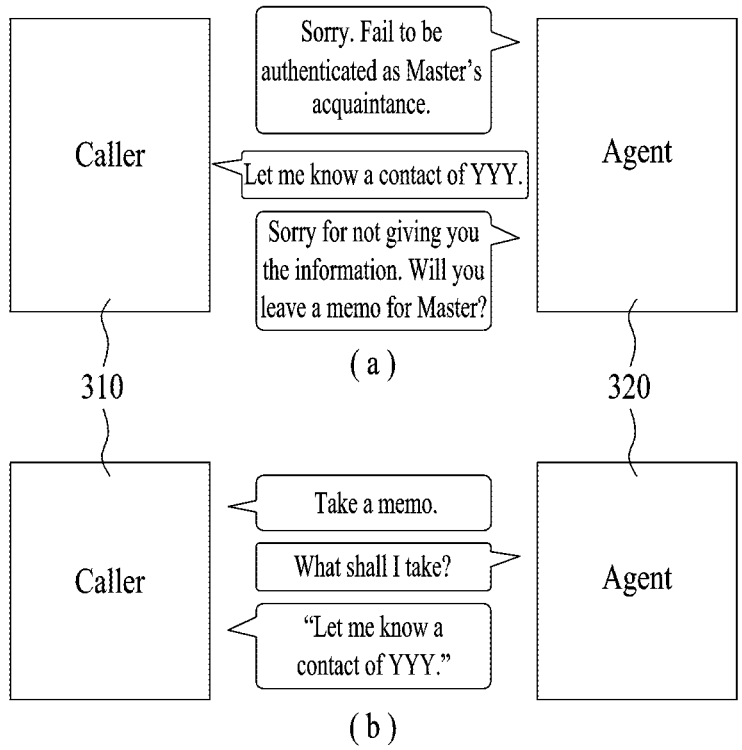
FIG. 8 is a diagram for one example of a type of providing a response to a stranger through a voice agent in a mobile terminal according to one embodiment of the present invention.
Figure 8:
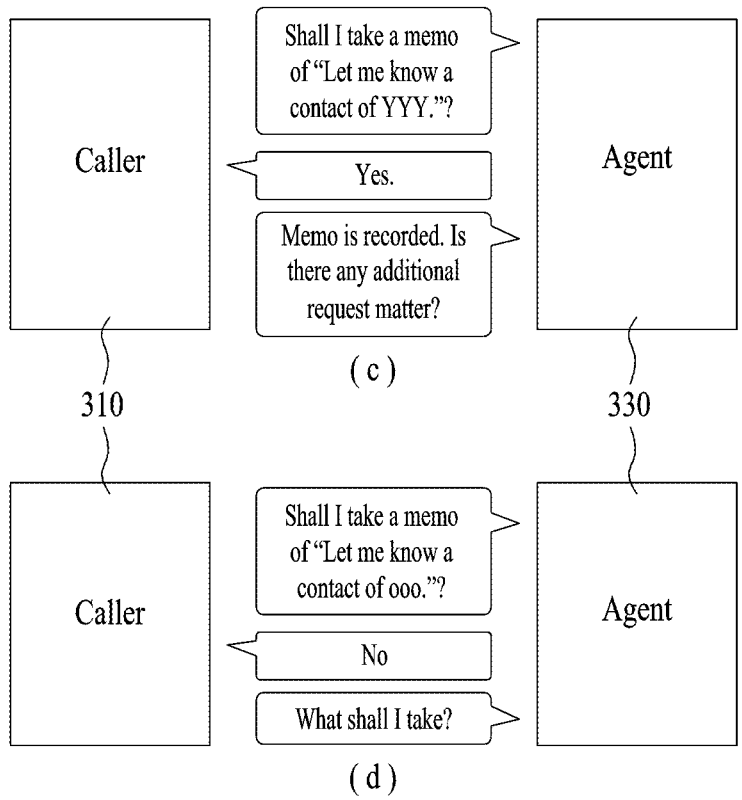

FIG. 8 is a diagram for one example of a type of providing a response to a stranger through a voice agent in a mobile terminal according to one embodiment of the present invention. In FIG. 8, assume a case that an agent is restricted to provide a stranger with a memo function only.

Referring to FIG. 8 (a), an agent 320 informs a caller 310 that the caller 310 is authenticated as a stranger. If the caller 310 requests a restricted function, the agent 320 can inform the caller 310 of providable functions. Hence, referring to FIG. 8 (b), if the caller requests the agent to take a memo, the agent accepts to take the memo and the caller is then able to deliver a memo content to the agent through a voice. As the memo content is delivered, referring to FIG. 8 (c), the agent has a result of recognition of the delivered voice confirmed by the caller again and is then able to inquire the caller whether there is another request. If the agent recognizes the voice incorrectly, referring to FIG. 8 (d), the agent may receive a delivery of the memo voice again from the caller.

And, it is a matter of course that the steps described with reference to FIGS. 8 (b) to 8 (d) can be performed if the caller determined as an acquaintance requests to leave a memo.

Meanwhile, since the memo content recognized by the agent can be displayed as the text on the terminal of the caller in the text mode or the UI mode in the above-described process, the confirmation of the memo content is facilitated. Yet, when the voice mode is applied only, if the caller terminal is not a smartphone or an application supportive of the text mode or the UI mode is not installed on the caller terminal despite the smartphone, for example, it is difficult for the recognized memo content to be checked as text in direct. In this case, a method for providing the caller terminal with the recognized content as text is described with reference to FIG. 9 and FIG. 10 as follows.

Figure 9:
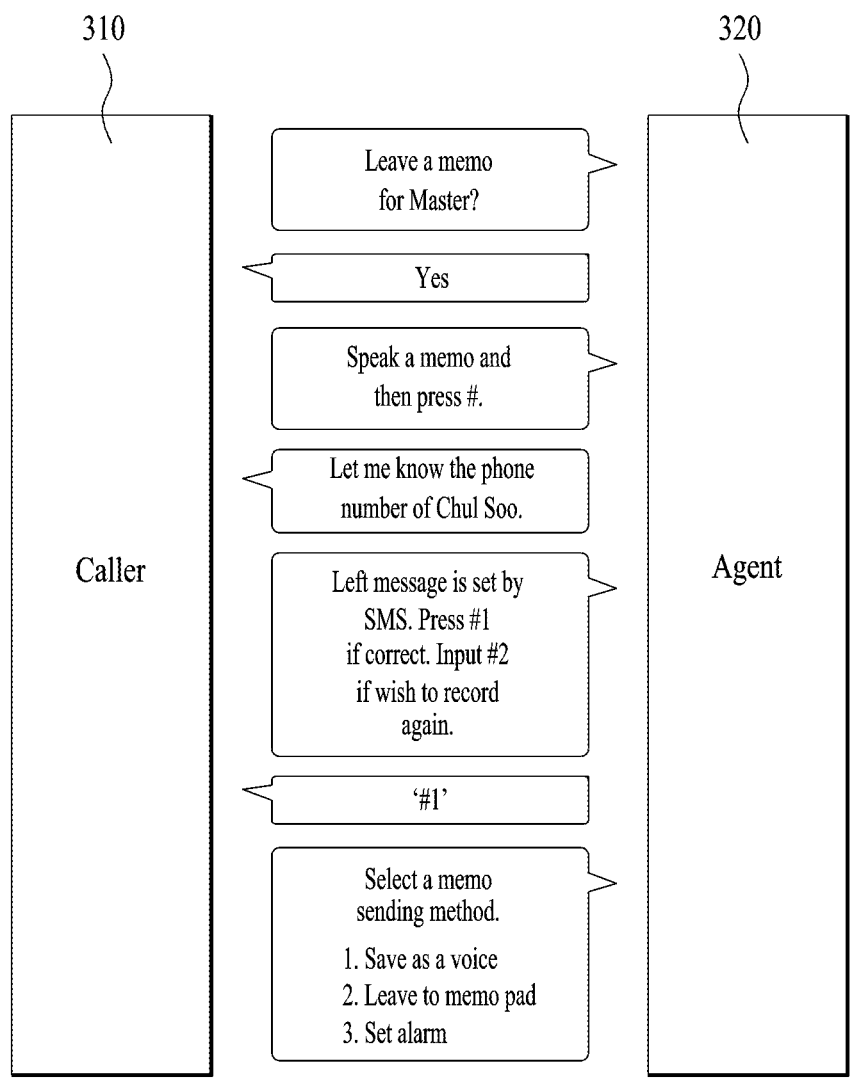
FIG. 9 is a diagram for one example of a process for confirming a memo recognized by a voice agent through a text from a caller according to one embodiment of the present invention.

FIG. 9 is a diagram for one example of a process for confirming a memo recognized by a voice agent through a text from a caller according to one embodiment of the present invention.

Referring to FIG. 9, as a caller requests to leave a memo, an agent 320 recognizes a voice delivered from the caller and is then able to send an SMS including a text corresponding to a result of the recognition to a terminal of the caller. Hence, the caller checks whether the memo left by the caller is correctly recognized through the SMS. If the left memo is correctly recognized, the caller is able to make a corresponding response (here, '#1'). Thereafter, the agent can inquire the caller whether to leave the corresponding memo in a prescribed form.

Figure 10:
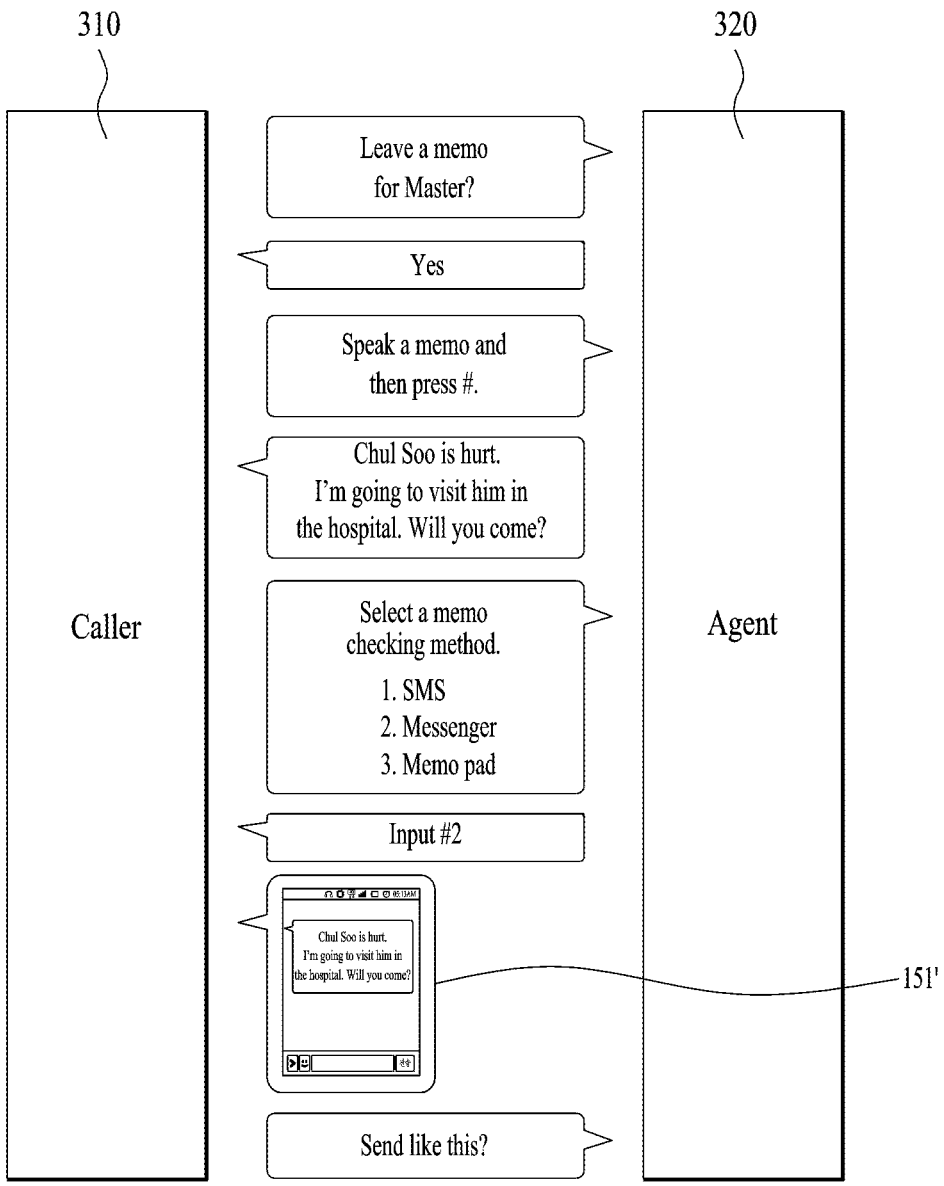
FIG. 10 is a diagram for another example of a process for confirming a memo recognized by a voice agent through a text from a caller according to one embodiment of the present invention.

FIG. 10 is a diagram for another example of a process for confirming a memo recognized by a voice agent through a text from a caller according to one embodiment of the present invention. In FIG. 10, assume a case that a terminal of a caller is a smartphone.

The process shown in FIG. 10 may proceed in a manner similar to that shown in FIG. 9 but enables a text confirmation by various methods. In particular, in order for a memo content, which is recognized by an agent, to be confirmed as a text by a caller, it is able to use SMS, messenger, or memo pad. If the messenger is selected, as shown in FIG. 10, the agent sends the recognized memo to the caller terminal through the messenger. Hence, the caller is able to confirm the memo recognition result displayed on the display 151' through the messenger. If '3. Memo pad' is selected, the agent can transmit a signal, which requests to run a memo application and to display a memo recognition result on the memo application, to the caller terminal.

A method of leaving a memo through a touch mode is described in detail with reference to FIG. 11 as follows.

Figure 11:
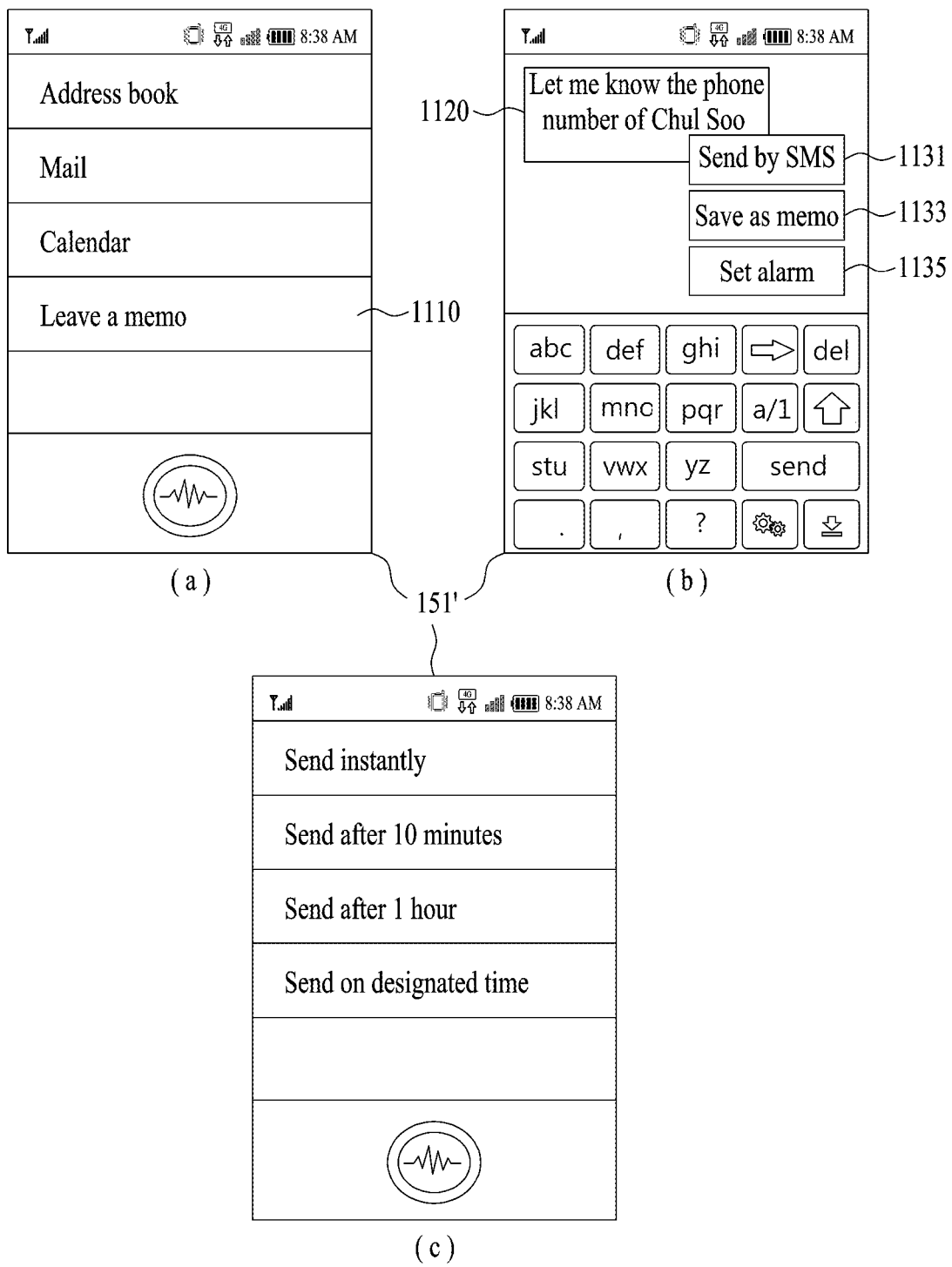
FIG. 11 is a diagram for one example of a process for leaving a memo at a voice agent through a touch mode according to one embodiment of the present invention.

FIG. 11 is a diagram for one example of a process for leaving a memo at a voice agent through a touch mode according to one embodiment of the present invention. In FIG. 11, assume a case that a touch mode is selected from a caller terminal.

Referring to FIG. 11 (*a*), as a touch mode is selected from a caller terminal, menus providable by an agent are displayed on a touchscreen 151' of the caller terminal. If a menu 'leave a memo' 1110 is selected, referring to FIG. 11 (*b*), a virtual keypad for composing a memo can be displayed. Through the virtual keypad, a caller is able to input a memo content 1120. After finishing the input, the caller can select a memo storage type. If a menu 'SMS transmission' 1131 is selected, referring to FIG. 11 (*c*), it may be able to select a transmission schedule. If a menu 'save as a memo' 1133 is selected, the agent can save the inputted content 1120 to a memo item of a memo application. If a menu 'alarm setting' 1135 is selected, the agent can output the inputted content through the touchscreen 151 on the alarm time punctually.

Figure 12:
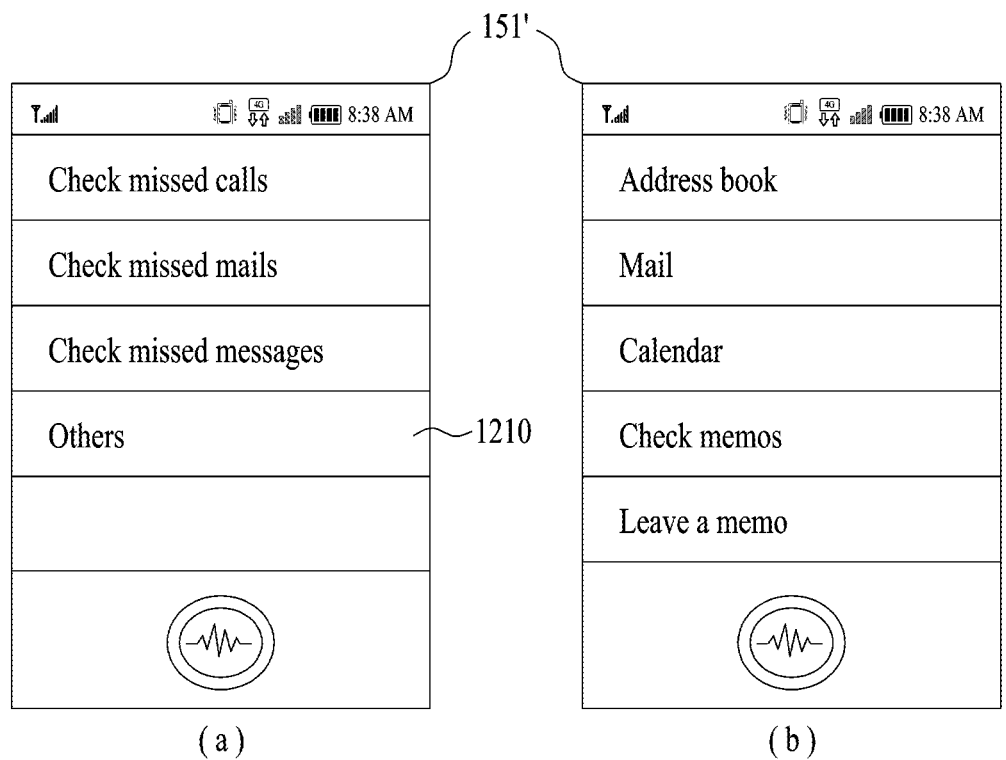
FIG. 12 is a diagram for one example of a touch mode type, which can be provided in case of determining a caller as a user of a mobile terminal, according to one embodiment of the present invention.

One example of a touch mode type, which can be provided if a caller is determined as a user of a mobile terminal, is described in detail with reference to FIG. 12 as follows.

As a caller is authenticated as a user and a touch mode is selected, a user interface corresponding to the touch mode can be provided onto a touchscreen 151' of a caller terminal. Yet, after an agent function has been activated, if there exists an unchecked communication event such as a missed call, an unchecked message/mail, or the like, a menu for checking an unchecked communication event can be displayed in the first place instead of a general menu for a mobile terminal user [FIG. 12 (*a*)]. In doing so, if a menu 'others' 1210 is selected, general menus for the mobile terminal user can be displayed [FIG. 12 (*b*)].

A method for a mobile terminal user to check an agent operation history through a mobile terminal is described in detail with reference to FIG. 13 as follows.

Figure 13:
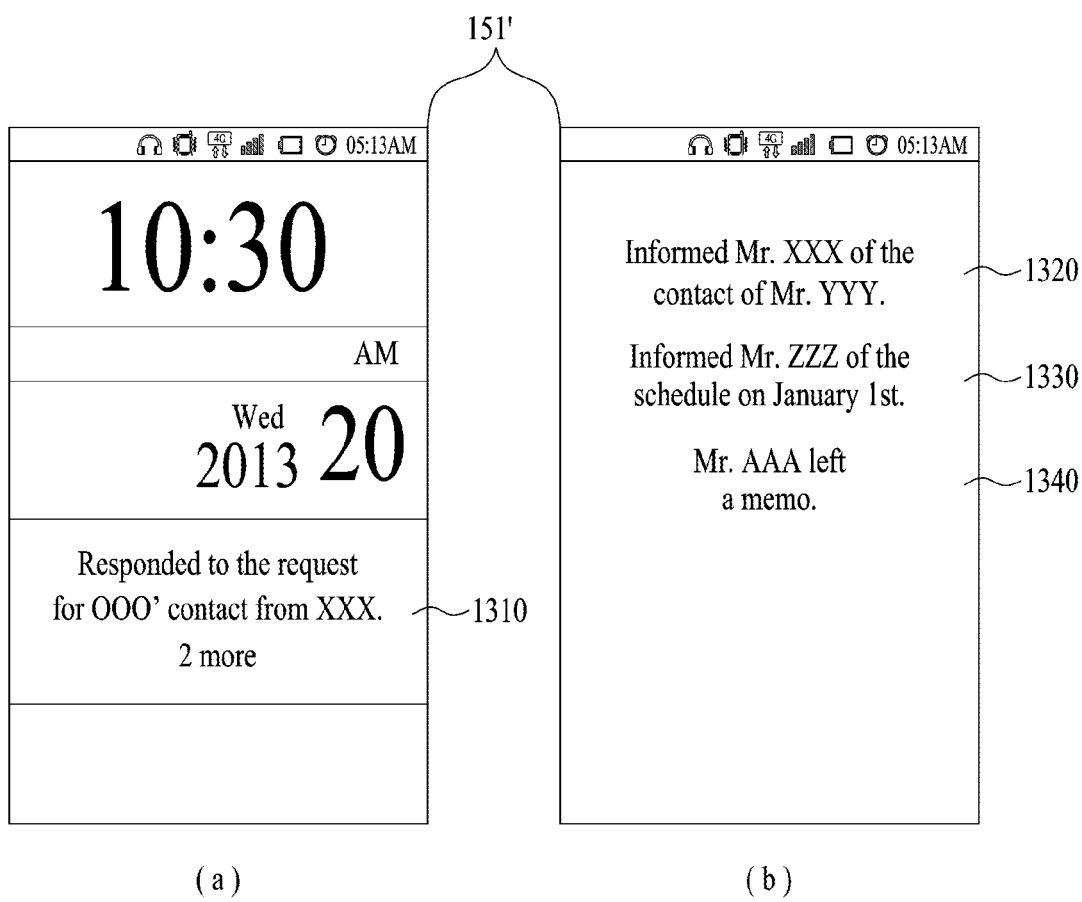
FIG. 13 is a diagram for one example of a method of informing a user of a voice agent operation history in a mobile terminal according to one embodiment of the present invention.

FIG. 13 is a diagram for one example of a method of informing a user of a voice agent operation history in a mobile terminal according to one embodiment of the present invention.

Referring to FIG. 13 (*a*), while a voice agent function is activated, if a user turns on the touchscreen 151 of the mobile terminal, an information 1310 schematically indicating an agent operation history can be displayed on a standby screen or a lock screen. In doing so, referring to FIG. 13 (*b*), if the user touches a region having the corresponding information displayed thereon or inputs a command for unlocking the lock screen, a detailed operation history can be displayed per item. Subsequently, if an item 1320 related to contacts is selected, an informed contact information can be displayed through a related application (e.g., a phonebook). If an item 1330 related to a schedule is selected, a corresponding schedule can be displayed through a schedule management application. Similarly, if an item 1340 related to a memo is selected, a saved memo can be displayed through a memo application.

In addition to the above-described functions, when there is an incoming call signal from the caller, the agent can connect the user and the caller to each other by making a phone call to a number previously registered by the user after completion of the authentication procedure.

Moreover, according to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned mobile terminal and controlling method thereof are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

INDUSTRIAL APPLICABILITY

Although the above-mentioned automatic response function is described by mainly taking the example applied to a mobile terminal, it can be implemented through various means such as an electronically interpretable storage medium and the like as well as through a fixed terminal.

What is claimed is:

1. A method of controlling a mobile terminal, the method comprising:
   activating an automatic response function;
   accepting a voice call in response to an incoming call signal originated from a device of a caller without requiring a user input in response to the incoming call signal, the incoming signal received by the mobile terminal while the automatic response function has been activated;
   performing an authentication procedure with regard to the caller to determine whether the caller is a user or owner of the mobile terminal;
   determining a response mode, the response mode comprising at least one of a voice mode, a text mode, or a graphic user interface mode;
   transmitting an automatic response history to the caller device when the caller is the user or owner of the mobile terminal; and
   responding to the caller device via the determined response mode according to a result of the authentication procedure by at least one of:
      performing a function requested by the caller if the caller is the user or owner of the mobile terminal;
      not performing the requested function if the caller is not the user or owner of the mobile terminal; or informing the caller that the caller is not the user or owner of the mobile terminal when the function requested by the caller is not performed.

2. The method of claim 1, wherein:
the authentication procedure is performed using a voice of the caller recognized in the course of the accepted voice call; and
the authentication procedure is performed based on whether the caller is the user or owner of the mobile terminal, a person recognized as an acquaintance, or a person recognized as a stranger.

3. The method of claim 2, further comprising:
transmitting a text message corresponding to at least one portion of the recognized voice of the caller to the caller device.

4. The method of claim 1, wherein the responding to the caller device comprises informing at least one available function according to the result of the authentication procedure to the caller.

5. The method of claim 1, further comprising:
at least transmitting a voice message, transmitting a text message, or causing display of a graphic user interface at the caller device in consideration of a type of the caller device.

6. The method of claim 1, further comprising:
transmitting a signal to the caller device,
wherein the signal is for requesting the caller device to run a prescribed application to enable display of a response history at the caller device.

7. The method of claim 1, further comprising:
sending a request for additional information to an external server to receive the additional information in response to a request by the caller for the additional information associated with the function.

8. The method of claim 7, further comprising:
storing the received additional information in a memory.

9. A mobile terminal comprising:
a wireless communication unit; and
a controller configured to:
activate an automatic response function;
accept a voice call in response to an incoming call signal originated from a device of a caller without requiring a user input in response to the incoming call signal, the incoming signal received via the wireless communication unit while the automatic response function has been activated;
perform an authentication procedure with regard to the caller to determine whether the caller is a user or owner of the mobile terminal;
determine a response mode, the response mode comprising at least one of a voice mode, a text mode, or a graphic user interface mode;
cause the wireless communication unit to transmit an automatic response history to the caller device when the caller is the user or owner of the mobile terminal; and
respond to the caller device via the determined response mode according to a result of the authentication procedure by at least one of:
performing a function requested by the caller if the caller is the user or owner of the mobile terminal;
not performing the requested function if the caller is not the user or owner of the mobile terminal; or
informing the caller that the caller is not the user or owner of the mobile terminal when the function requested by the caller is not performed.

10. The mobile terminal of claim 9, wherein:
the authentication procedure is performed using a voice of the caller recognized in the course of the accepted voice call; and
the authentication procedure is performed based on whether the caller is the user or owner of the mobile terminal, a person recognized as an acquaintance, or a person recognized as a stranger.

11. The mobile terminal of claim 10, wherein the controller is further configured to cause the wireless communication unit to transmit a text message corresponding to at least one portion of the recognized voice of the caller to the caller device.

12. The mobile terminal of claim 9, wherein the controller is further configured to cause the wireless communication unit to transmit information informing at least one available function according to the result of the authentication procedure to the caller.

13. The mobile terminal of claim 9, wherein the controller is further configured to cause the wireless communication unit to transmit at least a voice, a text message or a signal causing display of a graphic user interface at the caller device in consideration of a type of the caller device.

14. The mobile terminal of claim 9, wherein the controller is further configured to cause the wireless communication unit to transmit a signal, wherein the signal is for requesting the caller device to run a prescribed application to enable display of a response history at the caller device.

15. The mobile terminal of claim 9, wherein the controller is further configured to cause the wireless communication unit to transmit a request for additional information to an external server to receive the additional information in response to a request by the caller for the additional information associated with the function.

16. The mobile terminal of claim 15, further comprising a memory, wherein the controller is further configured to cause the memory to store the received additional information.

* * * * *